(12) United States Patent
Shehi et al.

(10) Patent No.: US 7,873,446 B2
(45) Date of Patent: Jan. 18, 2011

(54) ALTIMETER SETTING DISPLAY AND STORAGE SYSTEM AND METHOD

(75) Inventors: Christopher J. Shehi, Glendale, AZ (US); Jary E. Engels, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 776 days.

(21) Appl. No.: 11/706,671

(22) Filed: Feb. 13, 2007

(65) Prior Publication Data

US 2008/0195263 A1 Aug. 14, 2008

(51) Int. Cl.
*G06F 17/00* (2006.01)
(52) U.S. Cl. .................... 701/4; 701/9; 345/7; 340/977
(58) Field of Classification Search ............... 701/4, 701/5, 8, 16, 9; 244/180, 181, 183; 345/156, 345/501, 565, 1.1, 7, 8, 9; 715/771; 340/977; *G06F 17/00*
See application file for complete search history.

(56) References Cited

U.S. PATENT DOCUMENTS

| | | | | |
|---|---|---|---|---|
| 4,023,414 A * | 5/1977 | Bone | ............................ | 73/387 |
| 4,916,448 A * | 4/1990 | Thor | ............................ | 340/970 |
| 6,285,298 B1 * | 9/2001 | Gordon | ........................ | 340/945 |
| 6,366,836 B1 * | 4/2002 | Johnson | .......................... | 701/4 |
| 6,946,976 B1 * | 9/2005 | Langner et al. | ............. | 340/971 |
| 7,363,119 B2 * | 4/2008 | Griffin et al. | .................... | 701/3 |
| 7,625,515 B2 * | 12/2009 | Lee et al. | ..................... | 264/496 |
| 2005/0085959 A1 * | 4/2005 | Feyereisen | .................... | 701/14 |
| 2006/0167618 A1 * | 7/2006 | Werback | ...................... | 701/120 |
| 2007/0182590 A1 * | 8/2007 | Younkin | ...................... | 340/973 |

* cited by examiner

*Primary Examiner*—Tuan C To
(74) *Attorney, Agent, or Firm*—Ingrassia Fisher & Lorenz, P.C.

(57) ABSTRACT

A system and method for storing altimeter setting values on an aircraft display includes simultaneously rendering an altimeter and an active altimeter setting field, and selectively rendering a standby altimeter setting field simultaneously with the altimeter and the active altimeter setting field. An active altimeter setting value is rendered in the active altimeter setting field, and a stored altimeter setting value may be rendered in the standby altimeter setting field. Preferably, the stored altimeter setting value is selectively rendered in the standby altimeter setting field when the standby altimeter setting field is simultaneously rendered with the altimeter and the active altimeter setting field.

20 Claims, 7 Drawing Sheets

ALTIMETER SETTING DISPLAY AND STORAGE SYSTEM AND METHOD

TECHNICAL FIELD

The present invention generally relates to aircraft flight deck display systems and methods and, more particularly, to a system and method for displaying and storing a standby altimeter setting for later use.

BACKGROUND

Aircraft flight decks typically include multiple altimeters to display the altitude of the aircraft to the pilot or flight crew. The altimeter, as is generally known, provides an indication of the aircraft altitude as referenced to mean sea level (MSL), and is thus typically determined using static air pressure and an altimeter setting (or "reference pressure"). The static pressure is preferably sensed by one or more sensors, and the altimeter setting is entered by a user (e.g., pilot) via, for example, a baro-set knob or other user interface device. The altimeter setting that a user enters is typically either the local barometric air pressure or a standard barometric pressure (e.g., 29.92 in. Hg. or 1013 hPa). Typically, the altimeter setting is set to the local barometric air pressure when the aircraft flying below a predetermined transition altitude, and is set to the standard barometric pressure when flying above the transition altitude. This predetermined transition altitude may vary from airport to airport, country to country, and/or from flight jurisdiction to flight jurisdiction. In the United States this predetermined transition altitude is generally 18,000 feet MSL.

When an aircraft that is flying above the predetermined transition altitude is approaching its destination, the flight crew will typically receive the local barometric air pressure from the destination airport. This information may be supplied from the destination airport by air traffic control or other ground crew; however, it is more typically supplied via the Automatic Terminal Information Service (ATIS) broadcast from the destination airport. The local barometric air pressure may be received while the aircraft is still a considerable distance from the destination airport. Thus, the flight crew will most often store the local barometric air pressure using the baro-set knob on the aircraft's standby altimeter. Thereafter, when the aircraft transitions below the predetermined transition altitude, the flight crew sets the altimeter setting to the local barometric air pressure.

Although the above-described system and method of storing the local barometric air pressure is generally safe and reliable, it does suffer certain drawbacks. For example, if an aircraft does not include a standby altimeter or the standby altimeter is inoperable, then the flight crew may need to memorize the local barometric air pressure, write the local barometric air pressure on a kneeboard or other device, listen to the ATIS transmissions from the destination airport multiple times, or request that the ground crew supply the value just prior to descending below the transition altitude. All these alternatives can result in unneeded and unwanted distractions for the flight crew during aircraft descent.

Hence, there is a need for a system and method of at least selectively displaying a storing the local barometric air pressure that does not result in unneeded or unwanted distractions. Furthermore, other desirable features and characteristics of the present invention will become apparent from the subsequent detailed description and the appended claims, taken in conjunction with the accompanying drawings and this background.

BRIEF SUMMARY

In one embodiment, and by way of example only, an aircraft display system includes a display device and a processor. The processor is in operable communication with the display device, and is configured to command the display device to simultaneously render an altimeter and an active altimeter setting field, and at least selectively render a standby altimeter setting field simultaneously with the altimeter and the active altimeter setting field.

In another exemplary embodiment, a method of storing altimeter setting values on an aircraft display includes simultaneously rendering an altimeter and an active altimeter setting field, and selectively rendering a standby altimeter setting field simultaneously with the altimeter and the active altimeter setting field. An active altimeter setting value is rendered in the active altimeter setting field. When the standby altimeter setting field is simultaneously rendered with the altimeter and the active altimeter setting field, a stored altimeter setting value is selectively rendered in the standby altimeter setting field.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

Figure 1:
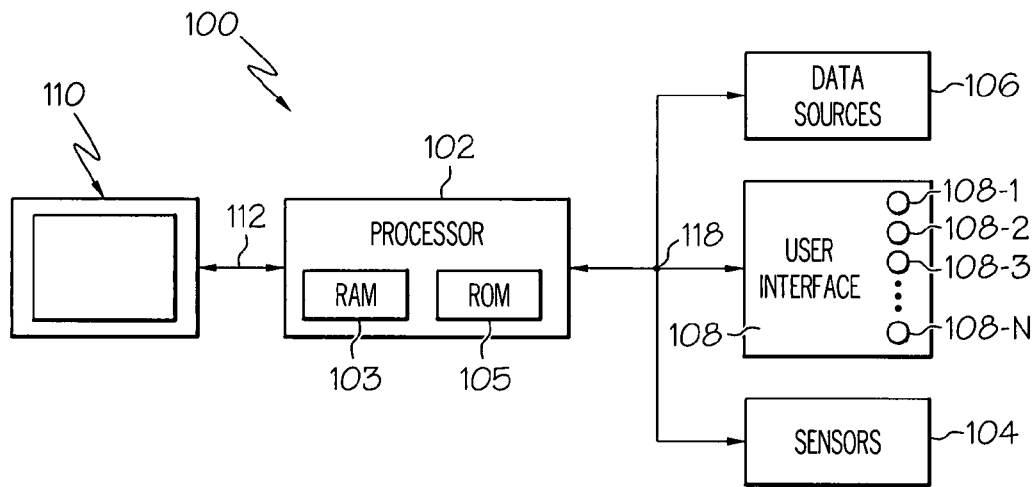
FIG. 1 is a functional block diagram of a flight deck display system according to an exemplary embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing Figures or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to FIG. 1, a portion of an exemplary flight deck display system 100 is depicted and includes at least a processor 102, various sensors 104, various data sources 106, one or more user interfaces 108, and a display device 110. The processor 102 may be any one of numerous known general-purpose microprocessors or an application specific processor that operates in response to program instructions. In the depicted embodiment, the processor 102 includes on-board RAM (random access memory) 103, and on-board ROM (read only memory) 105. The program instructions that control the processor 102 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 102 may be implemented using various other circuits, not just a programmable processor. For example, digital logic circuits and analog signal processing circuits could also be used.

No matter how the processor 102 is specifically implemented, it is in operable communication with the sensors 104, the data sources 106, and the user interface 108, the display device 110 via, for example, one or more communication buses 112. The processor 102 is coupled to receive various types of inertial data from the various sensors 104, various other avionics-related data from the data sources 106, and various signals from the user interface 108. The processor 102 is configured, upon receipt of these data and signals, to command the display device 110 to render various types of textual, graphic, and/or iconic information. The preferred manner in which the textual, graphic, and/or iconic information are rendered by the display device 110 will be described in more detail further below. Before doing so, however, a brief description of the sensors 104, the external data sources 106, and the user interface(s) 108, at least in the depicted embodiment, will be provided.

The sensors 104 may be implemented using various types of pressures sensors, inertial sensors, systems (such as the air data system), and or subsystems, now known or developed in the future, for supplying various types of sensor and/or inertial data. These data may also vary, and may include such data as, for example, aircraft speed, heading, altitude, and attitude, just to name a few. The number and type of external data sources 106 may also vary. For example, the external data sources 106 may include, for example, a terrain avoidance and warning system (TAWS), a traffic and collision avoidance system (TCAS), a runway awareness and advisory system (RAAS), an instrument landing system (ILS) receiver, a global position system (GPS) receiver, a terrain database, a navigation database, an airport map database, a flight director, and a navigation computer, just to name a few.

The user interface 108 is in operable communication with the processor 102 and is configured to receive input stimuli from a user (e.g., a pilot). The user interface 108, in response to the input stimuli, supplies various signals to the processor 102. The user interface 108 may be implemented using one or more (e.g., 108-1, 108-2, 108-3, . . . 108-N), or various combinations of, known user interface devices including, but not limited to, one or more buttons, switches (including "soft switches"), or knobs, and/or a cursor control device (CCD), such as a mouse, a trackball, or joystick, and/or a keyboard. It will be appreciated that if the user interface 108 is implemented using a plurality of user interface devices 108-1, 108-2, 108-3, . . . 108-N, each individual user interface device, only some of the user interface devices, or none of the user interface devices may be substantially collocated. In one particular embodiment, which is described in more detail further below, the user interface 108 is implemented using a plurality of switches and/or knobs.

The display device 110 includes a display 114 on which various images and data, in an iconic, graphical, and/or textual format, are rendered. It will be appreciated that the display 114 may be any one of numerous known displays suitable for rendering images and data in a format viewable by a user. Non-limiting examples of such displays 114 include various cathode ray tube (CRT) displays, and various flat panel displays such as, various types of LCD (liquid crystal display), and TFT (thin film transistor) displays. The display device 110 may additionally be implemented as a panel mounted display device, a HUD (head-up display) projection, or any one of numerous known technologies. It is additionally noted that the display device 110 may be configured as any one of numerous types of aircraft flight deck displays. For example, it may be configured as a multi-function display, a horizontal situation indicator, or a vertical situation indicator, just to name a few. In the depicted embodiment, however, the display device 110 is configured as a primary flight display (PFD).

Figure 2:
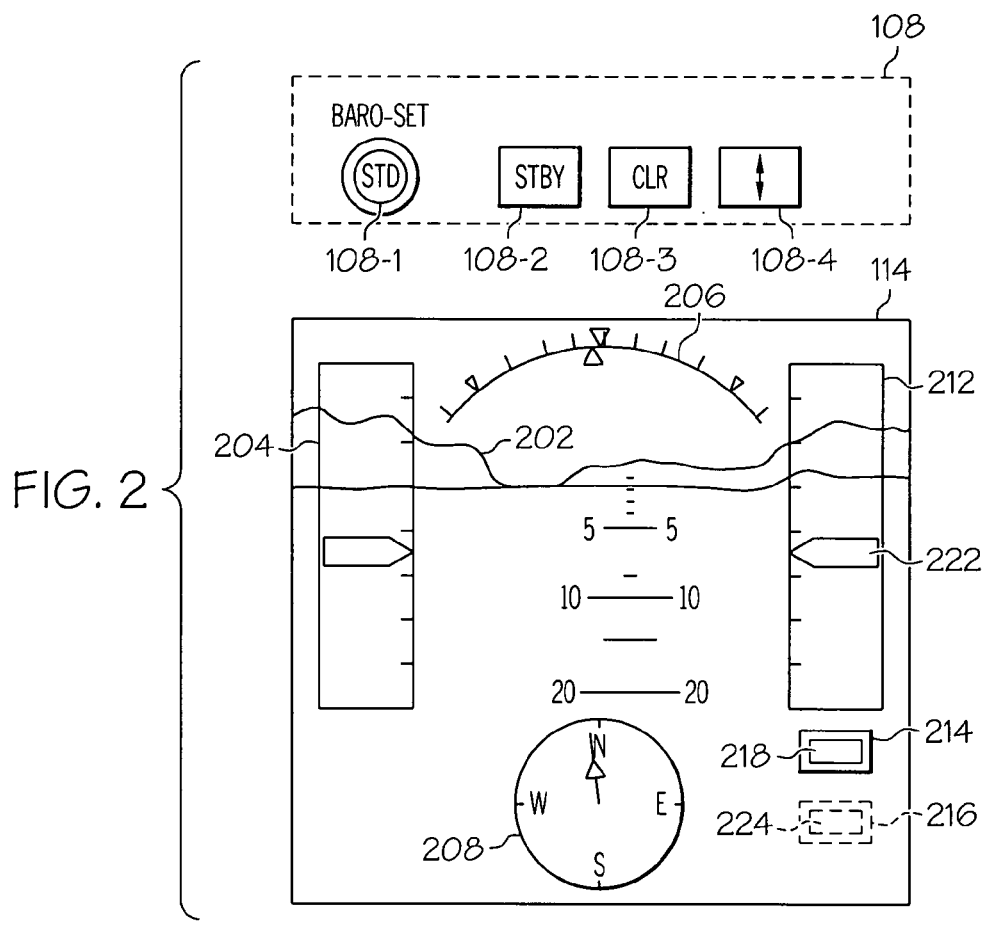
FIG. 2 depicts an exemplary image that may be rendered by the flight deck system of FIG. 1.

With reference now to FIG. 2, exemplary textual, graphical, and/or iconic information that the processor 102 may selectively command the display device 110 to render on the display 114 is depicted. It will be appreciated that the depicted information is merely exemplary of the number and types of information that may be rendered on the display 114, and that various other types and numbers of information may be rendered thereon. Nonetheless, in the depicted embodiment, a view of terrain 202 ahead of the aircraft, an airspeed indicator 204, an attitude indicator 206, a heading indicator 208, an altimeter 212, and an active altimeter setting field 214 are rendered on the display 114. In addition, a standby altimeter setting field 216, which is depicted in phantom in FIG. 2, may also be selectively rendered on the display 114 simultaneously with the altimeter 212 and the active altimeter setting field 214. The terrain view 202, the airspeed indicator 204, the attitude indicator 206, the heading indicator 208, and the altimeter 212 are preferably displayed in a conventional manner, and as such will not be further described. However, the manner in which the active altimeter setting field 214 and the standby altimeter setting field 216 are displayed is not conventional, and will thus now be described in more detail.

The active altimeter setting field 214 is preferably rendered adjacent the altimeter 212, and is used to display an active altimeter setting value 218. The active altimeter setting value 218 is synonymous with the previously mentioned altimeter setting value, and is thus used in determining the aircraft altitude 222 that is displayed on the altimeter 212. The standby altimeter setting field 216, when rendered on the display 114, is preferably rendered adjacent the active altimeter setting field 214, and is used to selectively display a stored altimeter setting value 224. It will be appreciated that the positions at which the active altimeter setting field 214 and the standby altimeter setting field 216 are rendered on the display 114 is merely exemplary, and that these fields 214, 216 could be rendered at any one of numerous other positions on the display 114.

The active altimeter setting value 218 and the stored altimeter setting value 224 are both preferably user-enterable and user-adjustable values. The active altimeter setting value 218, as just noted, is used in the aircraft altitude determination. Thus, this value 218 is typically set to either the local barometric air pressure or the standard barometric pressure. The stored altimeter setting value 224, when rendered, is preferably set to the local barometric air pressure of the destination of the aircraft, and is not used in the aircraft altitude determination. Thus, this value 224 does not affect the displayed aircraft altitude 222. However, as will now be described, the active altimeter setting value 218 may be selectively set equal to the stored altimeter setting value 224, and thus affect the displayed aircraft altitude 222.

During operation of the system 100, the active altimeter setting value 218 in the active altimeter setting field 214 is set to the standard barometric pressure whenever the aircraft is above the predetermined transition altitude. In addition, the standby altimeter setting field 216 is preferably not rendered, at least not until the aircraft receives the current barometric air pressure from the destination airport. The flight crew, either before, during, or after the current barometric air pressure is received, and preferably before the aircraft descends below the predetermined transition altitude, configures the system 100 to render the standby altimeter setting field 216, and enters the current barometric air pressure into the standby altimeter setting field 216 as the stored altimeter setting value 224. Thereafter, when the aircraft descends below the predetermined transition altitude, the system 100 is reconfigured so that the active altimeter setting value 218 is set equal to the stored altimeter setting value 224, and thus used in the aircraft altitude determination, and is rendered in the active altimeter setting field 214. It will be appreciated that the active altimeter setting value 218 may be set equal to the stored altimeter setting value 224 either automatically or manually.

The system 100 may implement the above-described operation using any one of numerous processes, techniques, and devices. In one particular embodiment, which will now be described in more detail, the system 100 includes a plurality of user interface devices 108 to selectively render and not render the standby altimeter setting field 214 on the display 114, and to enter, adjust, and manipulate the active altimeter setting value 218 and the stored altimeter setting value 224. This particular system 100 additionally implements an operational process 300 that is depicted as a state diagram in FIG. 3. With reference again to FIG. 2, it is seen that the user interface devices 108, that at least this particular system 100 embodiment includes, are a barometric pressure setting (BARO-SET) knob 108-1, a standby (STBY) button 108-2, a clear (CLR) button 108-3, and an altimeter setting value toggle (↕)button 108-4. The functions of each of these user interface devices 108 will become apparent when the operational process 300 is described in more detail. Before describing the operational process 300, however, it is noted that the number and type of user interface devices 108 depicted in FIG. 2 and described below is merely exemplary of one particular embodiment and that more or less than this number of user interface devices 108, as well as different types of user interface devices 108, could be used. Moreover, the functions implemented by the user interface devices 108 could be implemented by any one of the other user interface devices, or other user interface devices altogether. It is additionally noted that the user interface devices 108 that are included in the depicted embodiment and various other embodiments may be located in any one of numerous positions on, near, or remote from the display device 110.

Figure 3:
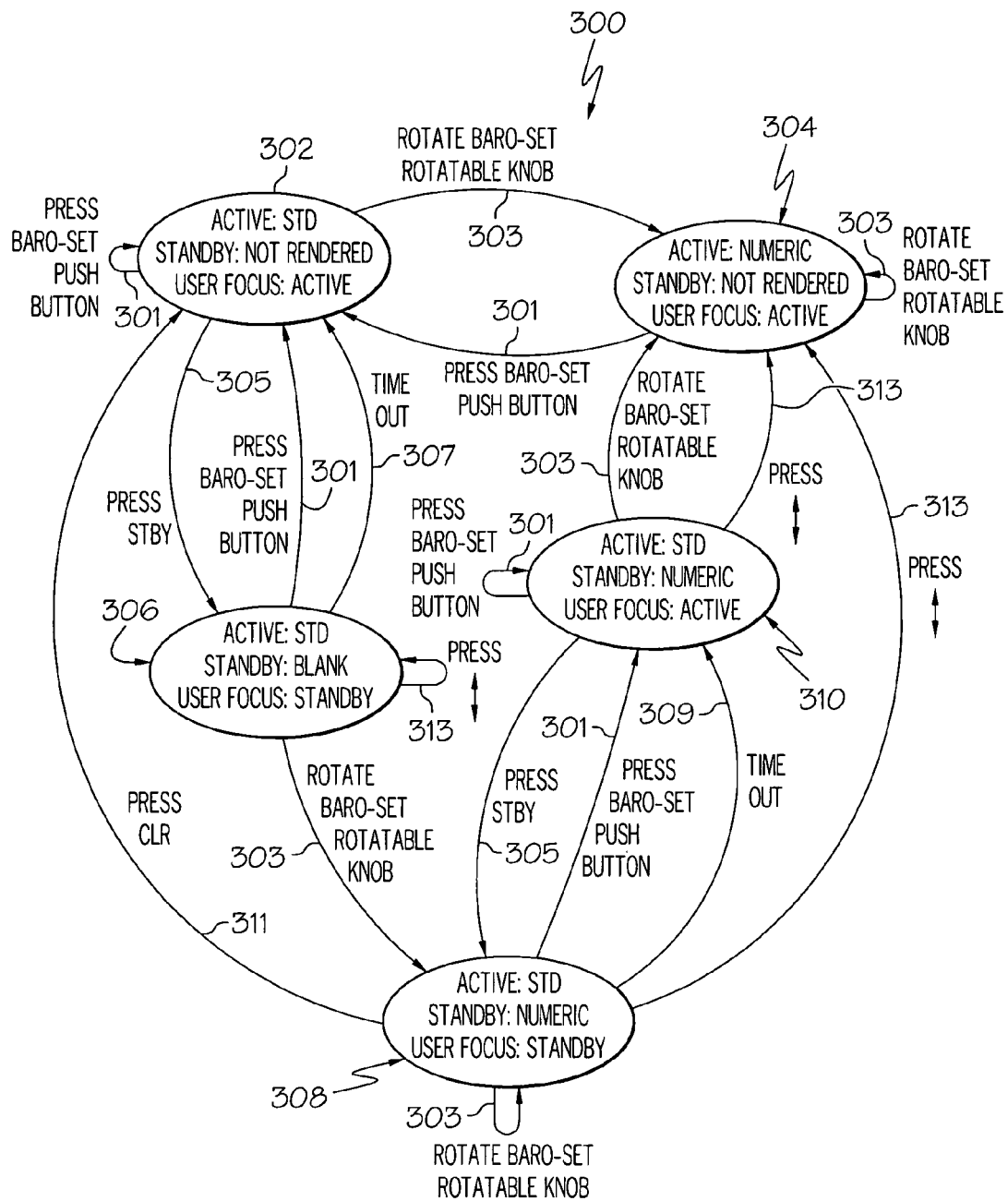
FIG. 3 depicts a state diagram representative of an exemplary process implemented by the exemplary system of FIG. 1.
Figure 4:
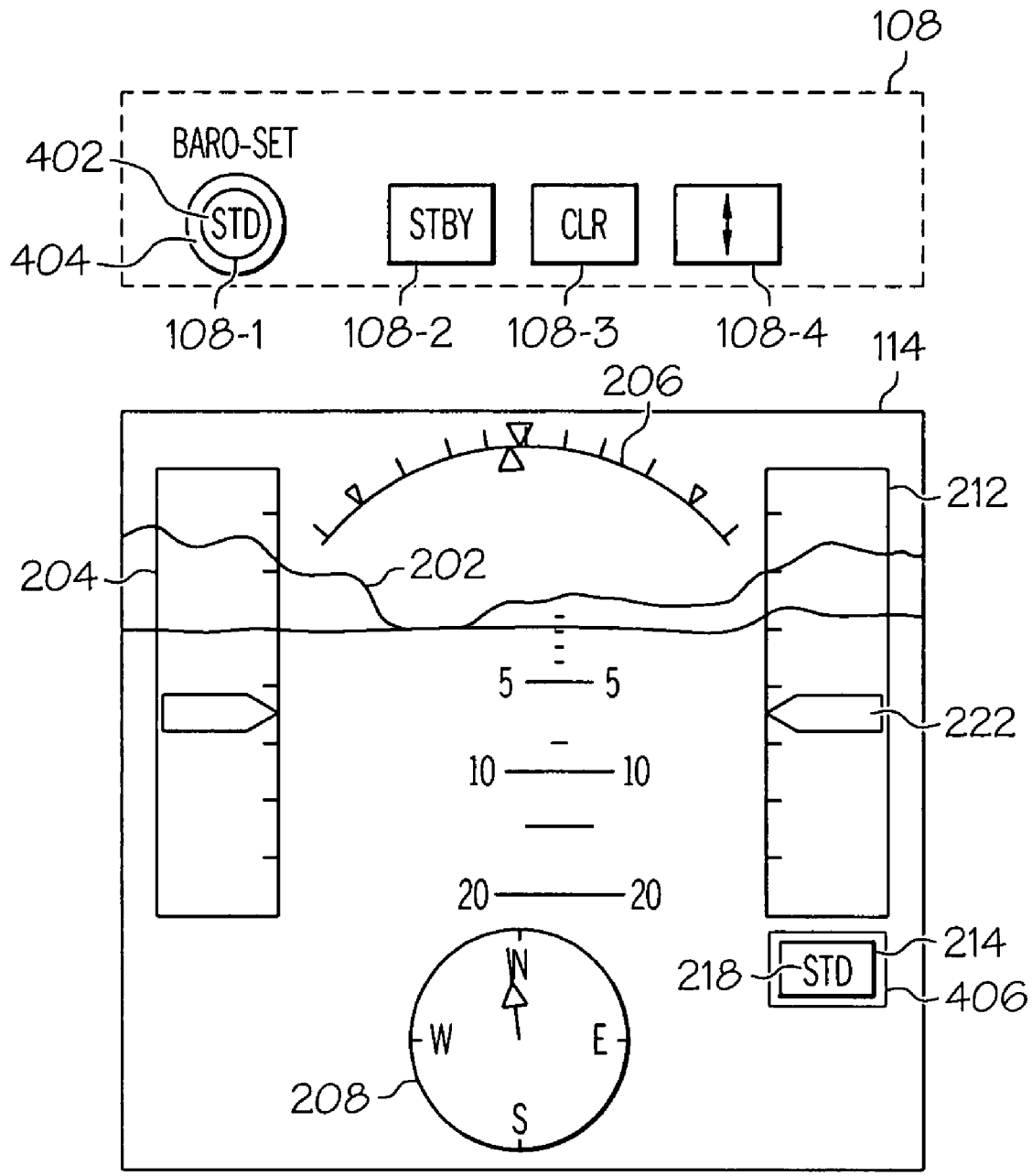
FIGS. 4-8 depict exemplary images that may be rendered by the flight deck system of FIG. 1 in various ones of the states depicted in FIG. 3.

Turning now to FIG. 3, the description of the operational process 300 will begin with the assumption that the system 100 is in an aircraft above the predetermined transition altitude, and that the system 100 is configured to be in the state identified with reference numeral 302. Referring to FIGS. 3 and 4 together, it is seen that when the system 100 is in state 302 the processor 102 commands the display device 110 to render at least the altimeter 212 and the active altimeter setting field 214, and not render the standby altimeter field 216. Moreover, the active altimeter setting value 218 that is rendered in the active altimeter setting field 214 is the standard barometric pressure value. It will be appreciated that the standard barometric pressure value may be rendered either textually (e.g., STD) or numerically (e.g., 29.92 in. Hg. or 1013 HPa). However, as shown in FIGS. 3 and 4, whenever the system 100 is in state 302, the active altimeter setting value 218 is rendered textually as "STD" in the active altimeter setting field 214. It will additionally be appreciated that the standard barometric pressure value is used in making the aircraft altitude determination.

The system 100 will remain in state 302 unless or until particular user input stimuli is supplied to either the barometric pressure setting knob 108-1 or the standby button 108-2. More specifically, and with reference to FIG. 4, it is seen that the depicted barometric pressure setting knob 108-1 is configured similar to various conventional barometric pressure setting knobs. As such, it includes both a push-button 402 and a rotatable knob 404. Preferably, and as FIG. 3 depicts, no matter how many times the barometric pressure setting knob push-button 402 is pressed 301 while in state 302, the active altimeter setting value 218 will continuously render the text "STD" in the active altimeter setting field 214. However, if the barometric pressure setting knob rotatable knob 404 is rotated 303 or the standby button 108-2 is pressed 305 while in state 302, then the system 100 transitions to state 304 or state 306, respectively.

Figure 5:
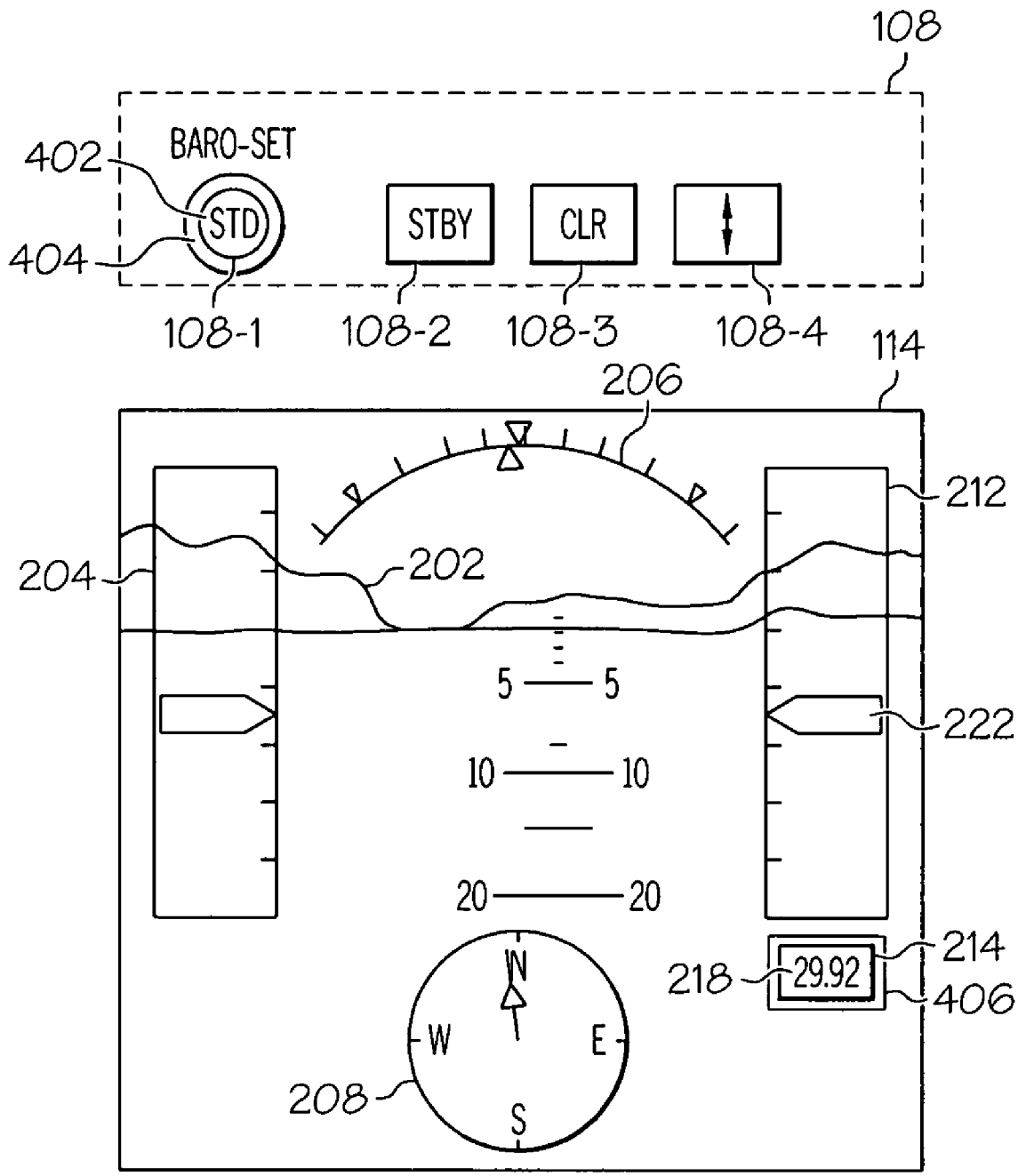

Turning now to FIG. 5, it is seen that in state 304 the processor 102 continues to command the display device 110 to render at least the altimeter 212 and the active altimeter field 214, and to not render the standby altimeter field 216. However, the active altimeter setting value 218 is rendered numerically in the active altimeter setting field 214. The specific numeric value that is rendered in the active altimeter setting field 214 is adjustable by a user rotating 303 the barometric pressure setting knob rotatable knob 404. The system 100 will remain in state 304 unless or until the barometric pressure setting knob push-button 402 is pressed 301, regardless of whether user input stimuli are supplied to the other user input devices 108-2, 108-3, 108-4. When the barometric pressure setting knob push-button 402 is pressed 301, the system 100 transitions back to state 302.

Before proceeding further it is noted that states 302 and 304 also indicate that a "User Focus" is on the active altimeter setting field 214. In other states 306, 308, which are described below, the "User Focus" is on the standby altimeter setting field 216. This nomenclature is used herein to denote that the active altimeter setting field 214 and the standby altimeter setting field 216 (when rendered) may be rendered with different visual attributes. The visual attributes are used to, among other things, inform a user which setting field, either the active altimeter setting field 214 or the standby altimeter setting field 216, will vary in response to rotation 303 of the barometric pressure setting knob rotatable knob 404. It will be appreciated that the specific visual attributes that are used to implement the "User Focus" of each state may vary. In the depicted embodiment, the visual attributes are implemented by rendering a box 406 around the active altimeter setting field 214 or the standby altimeter setting field 216. Other non-limiting examples include rendering the fields, or portions thereof, in brighter or different colors, with distinct labeling, using different fonts, or using inverse video.

Figure 6:
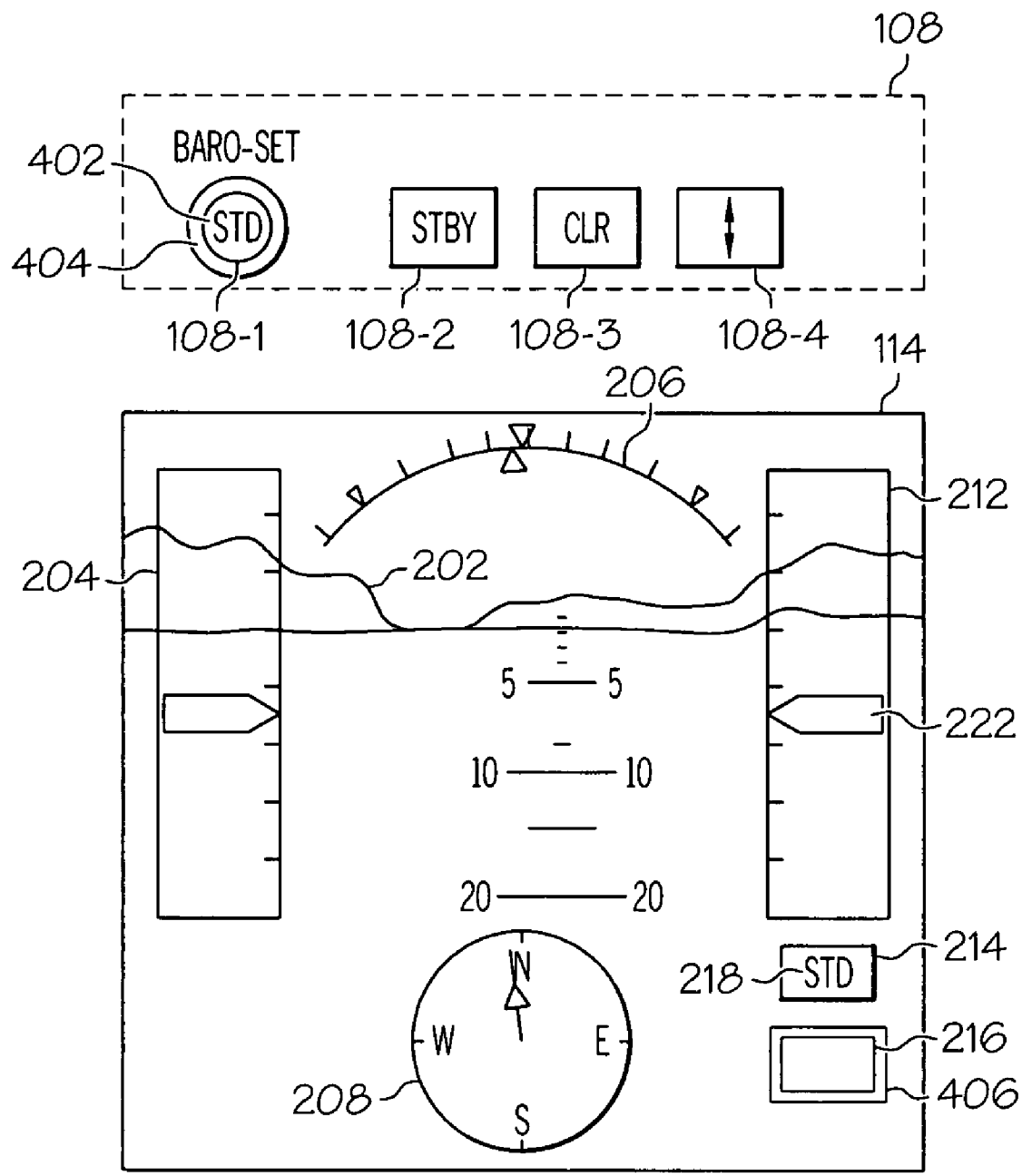

Returning once again to FIG. 3, it was previously noted that the system 100 will also transition out of state 302 and into state 306 if the standby button 108-2 is pressed 305. In state 306, as FIG. 6 depicts, the processor 102 commands the display device 110 to simultaneously render at least the altimeter 212, the active altimeter setting field 214, and the standby altimeter setting field 216. As FIG. 6 also depicts, the active altimeter setting field 214 continues to be rendered with STD to represent the active altimeter setting value 218, the standby altimeter setting field 216 is rendered blank (i.e., no stored altimeter setting value 224), and with the visual attributes 406 that preferably place the "User Focus" on the standby altimeter setting field 216 and inform the user that the standby altimeter setting field 216 may be adjusted by rotation 303 of the barometric pressure setting knob rotatable knob 404.

The system 100 will remain in state 306 unless or until the barometric pressure setting knob push-button 402 is pressed 301, the barometric pressure setting knob rotatable knob 404 is rotated 303, or the system 100 has been in state 306 for a predetermined time period 307 without input stimuli being supplied to the barometric pressure setting knob 108-1. More specifically, if the barometric pressure setting knob push-button 402 is pressed 301, or the predetermined time period 307 lapses without input stimuli being supplied to the barometric pressure setting knob 108-1, the system 100 transitions back to state 302. However, if a user rotates 303 the barometric pressure setting knob rotatable knob 404, the system 100 then transitions to state 308.

Figure 7:
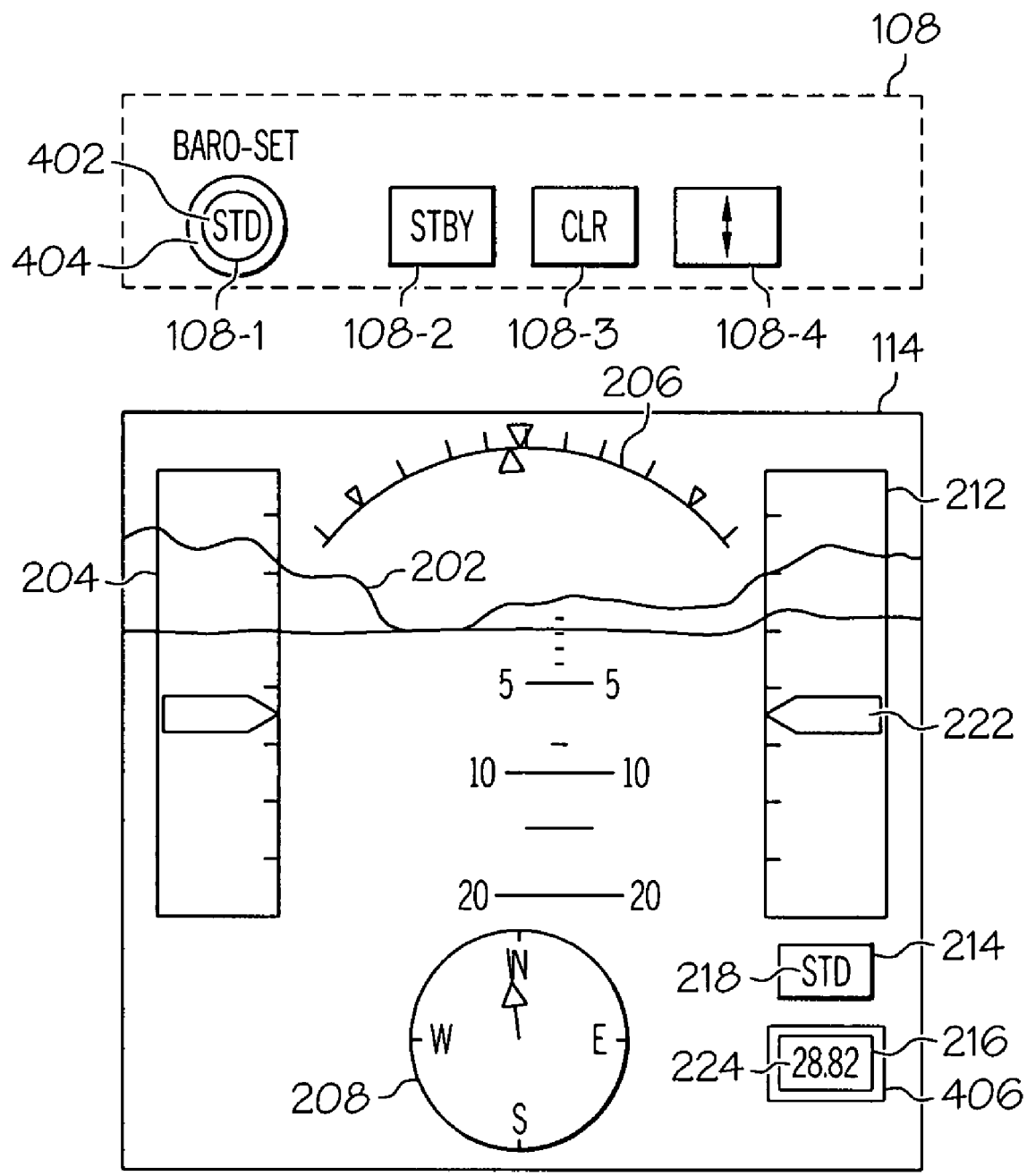

In state 308, as depicted in FIG. 7, the processor 102 continues to command the display device 110 to simultaneously render at least the altimeter 212, the active altimeter setting field 214 (with STD), and the standby altimeter setting field 216 with the visual attributes 406 that preferably place the "User Focus" thereon. However, rather than being rendered blank, a stored altimeter setting value 224 is rendered numerically in the standby altimeter setting field 216. Moreover, the value is adjusted to a desired value by rotating 303 the barometric pressure setting knob rotatable knob 404. It may thus be appreciated that the system 100 is commanded to transition into states 306 and 308 when the aircraft is above the predetermined transition altitude and is receiving the current barometric air pressure from the destination airport. The flight crew may then enter the current barometric air pressure into the standby altimeter setting field 216 as the stored altimeter setting value 224.

The system 100 remains in state 308 unless or until the barometric pressure setting knob push-button 402 is pressed 301, the system 100 has been in state 308 for a predetermined time period 309 (which may be the same as, or different than, the predetermined time period 307) without being supplied with input stimuli, the clear (CLR) button 108-3 is pressed 311, or the altimeter setting value toggle button 108-4 is pressed 313. More specifically, if the clear button 108-3 is pressed 311, the system 100 transitions back to state 302, which is depicted in FIG. 4. If the altimeter setting value toggle button 108-4 is pressed 313, the stored altimeter setting value 224 becomes the active altimeter setting value 218, and is rendered in the active altimeter setting field 214, and the system transitions into state 304, which is depicted in FIG. 5. If the barometric pressure setting knob push-button 402 is pressed 301, or the predetermined time period 309 lapses without input stimuli being supplied to the barometric pressure setting knob 108-1, the clear button 108-3, or the altimeter setting value toggle button 108-4, then the system transitions to state 310.

Figure 8:
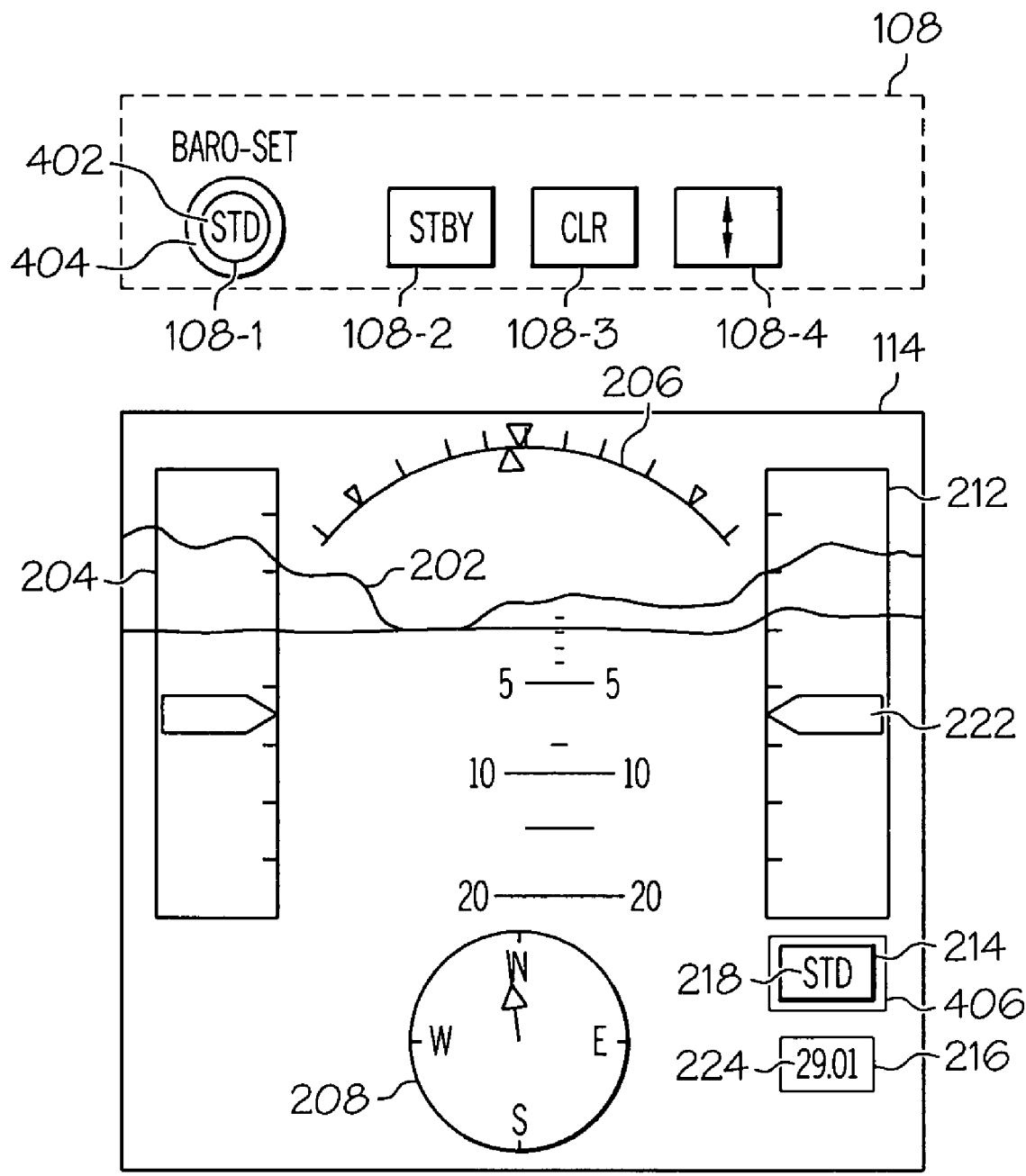

In state 310, as depicted in FIG. 8, the processor 102 continues to command the display device 110 to simultaneously render at least the altimeter 212, the active altimeter setting field 214 with the active altimeter value 218 rendered therein as "STD", and the standby altimeter setting field 216 with the stored altimeter setting value 224 rendered numerically therein. However, the active altimeter setting field 214 is now rendered with the visual attributes 406 that preferably place the "User Focus" thereon. Thus, the standard barometric pressure value is used in the aircraft altitude determination.

Returning again to FIG. 3, it is seen that the system 100 will remain in state 310 no matter how many times the barometric pressure setting knob push-button 402 is pressed 301. However, if the standby button 108-2 is pressed 305, then the system transitions back to state 308, which is depicted in FIG. 7. In addition, if the barometric pressure setting knob rotatable knob 404 is rotated 303, or the altimeter setting value toggle button 108-4 is pressed, then the system 100 transitions to state 304, which is depicted in FIG. 5. Since state 304 and state 308 have already been described, the description of these states 304, 308 will not be repeated.

The process 300 described above, when implemented by the system 100, causes the active altimeter setting value 222 to be set equal to the stored altimeter setting value 224 in response to a user input from one of the user interface devices. In alternative embodiments, the system 100 may be configured to automatically set the active altimeter setting value 222 equal to the stored altimeter setting value 224 whenever the aircraft transitions from above the predetermined transition altitude to below the predetermined transition altitude the active. In embodiments, the processor 102 is preferably configured, using inertial data from the sensors 104, or data from the data sources 106, or both, to determine when the aircraft makes the altitude transition. It will additionally be appreciated that one or more of the process states described above could be eliminated or implemented automatically, as needed or desired.

The system and method described herein allows an aircraft pilot and/or flight crew to selectively and conveniently display and store the local barometric air pressure value for the destination airport. The system and method reduce or eliminate unneeded and unwanted distractions during aircraft descent to the destination airport.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft display system, comprising:
   a display device; and
   a processor in operable communication with the display device, the processor adapted to receive an altimeter setting signal representative of an altimeter setting value and an altimeter value toggle signal and configured to command the display device to:
   (i) simultaneously render an altimeter and an active altimeter setting field, (ii) at least selectively render a standby altimeter setting field simultaneously with the altimeter and the active altimeter setting field, (iii) in response to receipt of the altimeter setting signal, selectively render the altimeter setting value as either (a) an active altimeter setting value in the active altimeter setting field or (b) as a stored altimeter setting value in the standby altimeter setting field, and (iv) in response to receipt of the altimeter value toggle signal, to selectively command the display device to render the stored altimeter setting value in the active altimeter setting field.

2. The system of claim 1, wherein the processor is adapted to receive a standby field activation signal and is further configured to command the display device, in response to receipt of the standby field activation signal, to render the standby altimeter setting field simultaneously with the altimeter and the active altimeter setting field.

3. The system of claim 2, wherein the processor is further configured to selectively command the display device to cease rendering the standby altimeter setting field after a predetermined time period.

4. The system of claim 2, further comprising:
a user interface in operable communication with the processor, the user interface configured to receive input stimuli from a user and, in response to the input stimuli, to supply the standby field activation signal.

5. The system of claim 1, further comprising:
a user interface in operable communication with the processor, the user interface configured to receive input stimuli from a user and, in response to the input stimuli, to supply the altimeter setting signal to the processor.

6. The system of claim 1, wherein the processor is further configured to render aircraft altitude on the altimeter.

7. The system of claim 1, wherein the processor is further configured to command the display device to (i) selectively render the active altimeter setting value as a numeric value or a textual value and (ii) render the stored altimeter setting value as a numeric value.

8. The system of claim 1, further comprising:
a user interface in operable communication with the processor, the user interface configured to receive input stimuli from a user and, in response to the input stimuli, to supply the altimeter setting value toggle signal to the processor.

9. The system of claim 1, wherein the processor is further configured to be responsive to the altimeter setting toggle signal to command the display device to render the standby altimeter setting field without the stored altimeter setting value.

10. The system of claim 1, wherein the processor is further operable configured to be responsive to the altimeter setting value toggle signal, to:
determine if a stored altimeter setting value is rendered in the standby altimeter setting field; and
command the display device to render the stored altimeter setting value in the active altimeter setting field only if a stored altimeter setting value is rendered in the standby altimeter field.

11. The system of claim 1, wherein the processor is further configured to:
determine when aircraft altitude transitions from above a predetermined transition altitude to below the predetermined transition altitude; and
automatically command the display device to render the stored altimeter setting value in the active altimeter setting field when the aircraft altitude transitions below the predetermined transition altitude.

12. The system of claim 11, wherein the processor is adapted to receive an aircraft altitude signal and is further operable, in response thereto, to determine when the aircraft altitude transitions below the predetermined transition altitude.

13. The system of claim 1, wherein the processor is further configured to selectively command the display device to simultaneously render the active altimeter setting field and the standby altimeter setting field with different visual attributes.

14. The system of claim 13, wherein the different visual attributes provide visual feedback as to whether the processor, in response to receipt of the altimeter setting signal, will command the display device to render the altimeter setting value as the active altimeter setting in the active altimeter setting field or the stored altimeter setting in the standby altimeter setting field.

15. The system of claim 13, wherein:
the different visual attributes include a first visual attribute and a second visual attribute;
if the active altimeter setting field is displayed with the first visual attribute and the standby altimeter setting field is displayed with the second visual attribute, the processor is further configured to selectively command the display device to display the active altimeter setting field with the second visual attribute and the standby altimeter setting field with the first visual attribute after a predetermined time period; and
if the active altimeter setting field is displayed with the second visual attribute and the standby altimeter setting field is displayed with the first visual attribute, the processor is further configured to selectively command the display device to display the active altimeter setting field with the first visual attribute and the standby altimeter setting field with the second visual attribute after a predetermined time period.

16. The system of claim 15, further comprising:
a user interface in operable communication with the processor and configured to receive input stimuli from a user,
wherein:
if the active altimeter setting field is displayed with the first visual attribute and the standby altimeter setting field is displayed with the second visual attribute, the processor is further configured to selectively command the display device to display the active altimeter setting field with the second visual attribute and the standby altimeter setting field with the first visual attribute in response to input stimuli being supplied to the user interface, and
if the active altimeter setting field is displayed with the second visual attribute and the standby altimeter setting field is displayed with the first visual attribute, the processor is further configured to selectively command the display device to display the active altimeter setting field with the first visual attribute and the standby altimeter setting field with the second visual attribute in response to input stimuli being supplied to the user interface.

17. An aircraft display system, comprising:
a display device; and
a processor in operable communication with the display device, the processor configured to command the display device to:

(i) simultaneously render an altimeter and an active altimeter setting field,
(ii) at least selectively render a standby altimeter setting field simultaneously with the altimeter and the active altimeter setting field,
(iii) at least selectively render an active barometric pressure in the active altimeter setting field, and
(iv) at least selectively render a stored barometric pressure in the standby altimeter setting field.

18. An aircraft display system, comprising:
a display device; and
a processor in operable communication with the display device, the processor adapted to receive an altimeter setting signal representative of an altimeter setting value and a standby field activation signal and configured to command the display device to:
(i) simultaneously render an altimeter and an active altimeter setting field,
(ii) at least selectively render a standby altimeter setting field simultaneously with the altimeter and the active altimeter setting field,
(iii) in response to receipt of the altimeter setting signal, selectively render the altimeter setting value as either (a) an active altimeter setting value in the active altimeter setting field or (b) as a stored altimeter setting value in the standby altimeter setting field,
(iv) in response to receipt of the standby field activation signal, to render the standby altimeter setting field simultaneously with the altimeter and the active altimeter setting field, and
(v) selectively command the display device to cease rendering the standby altimeter setting field after a predetermined time period.

19. An aircraft display system, comprising:
a display device; and
a processor in operable communication with the display device, the processor adapted to receive an altimeter setting signal representative of an altimeter setting value, a standby field activation signal, and a standby field deactivation signal, and configured to command the display device to:
(i) simultaneously render an altimeter and an active altimeter setting field,
(ii) at least selectively render a standby altimeter setting field simultaneously with the altimeter and the active altimeter setting field,
(iii) in response to receipt of the altimeter setting signal, selectively render the altimeter setting value as either (a) an active altimeter setting value in the active altimeter setting field or (b) as a stored altimeter setting value in the standby altimeter setting field,
(iv) in response to receipt of the standby field activation signal, to render the standby altimeter setting field simultaneously with the altimeter and the active altimeter setting field, and
(v) in response to receipt of the standby field deactivation signal, to cease rendering the standby altimeter setting field.

20. An aircraft display system, comprising:
a display device; and
a processor in operable communication with the display device, the processor adapted to receive an altimeter setting signal representative of an altimeter setting value and configured to determine when aircraft altitude transitions from above a predetermined transition altitude to below the predetermined transition altitude and further configured to command the display device to:
(i) simultaneously render an altimeter and an active altimeter setting field,
(ii) at least selectively render a standby altimeter setting field simultaneously with the altimeter and the active altimeter setting field,
(iii) in response to receipt of the altimeter setting signal, selectively render the altimeter setting value as either (a) an active altimeter setting value in the active altimeter setting field or (b) as a stored altimeter setting value in the standby altimeter setting field, and
(iv) command the display device to render the stored altimeter setting value in the active altimeter setting field when the aircraft altitude transitions below the predetermined transition altitude.

* * * * *